United States Patent [19]

Shin

[11] Patent Number: 5,723,084
[45] Date of Patent: Mar. 3, 1998

US005723084A

[54] FLASH SPINNING PROCESS

[75] Inventor: Hyunkook Shin, Wilmington, Del.

[73] Assignee: E. I. du Pont de Nemours and Company, Wilmington, Del.

[21] Appl. No.: 612,713

[22] Filed: Mar. 8, 1996

[51] Int. Cl.$^6$ .................................................. D01D 5/11
[52] U.S. Cl. ................................................................ 264/205
[58] Field of Search .............................. 264/13, 205, 211, 264/211.14

[56] References Cited

U.S. PATENT DOCUMENTS

| | | | |
|---|---|---|---|
| 3,081,519 | 3/1963 | Blades et al. | 57/248 |
| 3,227,664 | 1/1966 | Blades et al. | 264/205 X |
| 3,584,090 | 6/1971 | Parrish | 264/45.9 |
| 3,637,458 | 1/1972 | Parrish . | |
| 3,835,123 | 9/1974 | Nozaki | 528/392 |
| 3,851,023 | 11/1974 | Brethauer | 26/205 X |
| 3,914,391 | 10/1975 | Nozaki | 423/364 |
| 4,608,089 | 8/1986 | Gale et al. | 524/8 |
| 5,250,237 | 10/1993 | Shin | 264/13 |
| 5,279,776 | 1/1994 | Shah | 264/12 |
| 5,403,531 | 4/1995 | Rutten | 264/204 |

FOREIGN PATENT DOCUMENTS

| | | |
|---|---|---|
| 332 975 | 7/1989 | European Pat. Off. . |
| 360358 | 3/1990 | European Pat. Off. . |
| 456 306 | 11/1991 | European Pat. Off. . |

*Primary Examiner*—Leo B. Tentoni

[57] ABSTRACT

Olefin/carbon monoxide alternating polymers are flash-spun to form plexifilamentary products, pulp products, and foam products from alcohol or halogenated hydrocarbon solvents having 1 to 3 carbon atoms.

10 Claims, No Drawings

FLASH SPINNING PROCESS

FIELD OF THE INVENTION

This invention relates to the flash-spinning of high molecular weight alternating copolymers of olefin units and carbon monoxide units, where the olefin units are either all ethylene units or are mostly ethylene units, and the remainder of the olefin units are one or more units selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid. These copolymers are flash spun from a solvent having a boiling point between 0° and 210° C. and selected from the group consisting of alcohols and halogenated hydrocarbons having 1 to 3 carbon atoms. A preferred class of solvents are halogenated alcohols and a most preferred class of solvents are fluorinated alcohols.

BACKGROUND OF THE INVENTION

Alternating high molecular weight copolymers of olefin units and carbon monoxide are known: see U.S. Pat. Nos. 3,914,391 and 3,835,123 to Nozaki.

Published European Patent Application 0,360,358 discloses forming fibers from alternating high molecular weight copolymers of olefin units and carbon monoxide by solution or gel-spinning of a solution of the copolymer through a spinning aperture. The solvent employed are hexafluoroisopropanol, m-cresol, and mixtures thereof.

Flash-spinning of olefin polymers to produce non-woven sheets is practiced commercially and is the subject of numerous U.S. Patents including Brethauer et al. U.S. Pat. No. 3,851,023.

Flash-spinning of olefin polymers to produce pulp-like products from polymer solutions is disclosed in U.S. Pat. 5,279,776 to Shah. Pulp products can also be produced by disk refining (grinding) of olefin-polymer plexifilaments.

Flash-spinning of olefin polymers to produce microcellular and ultra-microcellular foam products from polymer solutions is disclosed in U.S. Pat. No. 3,227,664 to Blades et al. and U.S. Pat. No. 3,584,090 to Parrish.

SUMMARY OF THE INVENTION

The present invention is a process for the production of flash-spun plexifilamentary film-fibril strands or foam or pulp of a high molecular weight alternating copolymer of ethylene and carbon monoxide or a high molecular weight alternating copolymer having alternating polymerized units of carbon monoxide and at least two different olefin units one of which is ethylene, and the remainder are selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the olefin units are ethylene units, which comprises forming a spin solution of said alternating copolymer in a solvent having an atmospheric boiling point between 0° C. and 210° C., preferably between 0° C. and 170° C., and selected from the group consisting of alcohols and halogenated hydrocarbons having 1 to 3 carbon atoms and spinning said spin solution at a pressure that is greater than the autogenous pressure of the spin solution into a region of substantially lower pressure, and at a temperature at least 50° C. higher than the atmospheric boiling point of the solvent.

In its most preferred form in the process of the present invention the solvent is selected from the group consisting of n-pentafluoropropanol, trifluoroethanol, 2,2,3,3,-tetrafluoro-1-propanol, hexafluoroisopropanol, heptafluoro-1-butanol, cyclohexanol, 1-methyl cyclohexanol, cis-2-methylcyclohexanol, trans-2-methylcyclohexanol, cis-3-methylcyclohexanol, trans-3-methylcyclohexanol, benzyl alcohol, phenol, and m-cresol. The spin solution may contain more than one of said alcohols.

In one preferred embodiment the alternating copolymer consists of polymerized ethylene units and carbon monoxide units.

The present invention is also a spin solution of a high molecular weight alternating copolymer of ethylene and carbon monoxide or a high molecular weight copolymer having alternating polymerized units of carbon monoxide and at least two different olefin units one of which is ethylene, and the remainder are selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the polymerized olefin units are ethylene units, in an alcohol having an atmospheric boiling point between 0° C. and 210° C.

In one preferred embodiment the alcohol of the spin solution is a fluorinated alcohol and is preferably selected from the group consisting of n-pentafluoropropanol, trifluoroethanol, 2,2,3,3,-tetraflouro-1-propanol, hexafluoroisopropanol, and heptafluoro-1-butanol.

Usually in the spin solution the concentration of the copolymer in the solution is between 5 and 70 wt. % of the solution, preferably between 5 and 35 wt. % of the solution.

Normally, the solution is spun at a temperature between 200° C. and 300° C. (preferably 215° to 250° C.) and at a pressure of greater than about 500 psig.

The invention is also a plexifilament of a high molecular weight alternating copolymer of ethylene and carbon monoxide or a high molecular weight alternating copolymer having alternating polymerized units of carbon monoxide and at least two different olefin units one of which is ethylene, and the remainder are selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the polymerized olefin units are ethylene units.

The invention is also a foam of a high molecular weight alternating copolymer of ethylene and carbon monoxide or a high molecular weight alternating copolymer having polymerized units of carbon monoxide and at least two different polymerized olefin units one of which is ethylene, and the remainder are selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the polymerized olefin units are ethylene units.

The invention is also a pulp of high molecular weight alternating copolymer of ethylene and carbon monoxide or a high molecular weight alternating copolymer having polymerized units of carbon monoxide and at least two different olefin units one of which is ethylene, and the remainder are selected from group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the polymerized olefin units are ethylene units.

The plexifilaments of the invention may be formed into non-woven sheets (fabric) by the procedure disclosed in Brethauer et al. U.S. Pat. No. 3,851,023.

The pulps of the invention may be wet laid to form paper-like sheets (fabric) by the use of conventional paper-making processes.

DETAILED DESCRIPTION

In the alternating polymers of carbon monoxide and olefin, carbon monoxide is approximately every other unit of the polymer, and an olefin unit is every other unit. In the preferred embodiment, the olefin units are all ethylene, but up to ¼ of the olefin units may be one or more units selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid.

The term "autogenous pressure" is the natural vapor pressure of the spin mixture at a given temperature.

The morphology of flash spun fibers depends on the polymer concentration and spin conditions used. To obtain plexifilaments, relatively low polymer concentrations (e.g., less than about 35 wt. %) are normally used, and, in addition, spin temperatures used must be high enough to provide rapid flashing of the solvent. Well fibrillated plexifilaments are usually obtained when the spin temperature used is between the critical temperature of the spin liquid and 40° C. below the critical temperature.

Microcellular foams are usually prepared at relatively high polymer concentrations and relatively low spin temperatures and pressures. Nucleating agents, such as fumed silica and kaolin, are usually added to the spin mix to facilitate solvent flashing and to obtain uniform small size cells. Microcellular foams can be obtained in a collapsed form or in a fully or partially inflated form. For many polymer/solvent systems, microcellular foams will tend to collapse after exiting the spinning orifice as the solvent vapor condenses inside the cells and/or diffuses out of the cells. To obtain low density inflated foams, inflating agents are usually added to the spin liquid. Inflating agents to be used should have permeability coefficient for diffusion through the cell walls less than that of air so that they can stay inside the cells for a long period of time while allowing air to diffuse into the cells to keep the cells inflated. Osmotic pressure will cause air to diffuse into the cells. Suitable inflating agents that can be used include low boiling halocarbons such as hydrochlorofluorocarbons, hydrofluorocarbons, chlorofluorocarbons, and perfluorocarbons (e.g., octafluorocyclobutane); inert gases such as carbon dioxide, and nitrogen; low boiling hydrocarbon solvents such as butane and isopentane; and other low boiling organic solvents and gases. The atmospheric boiling points of these inflatants are typically between the room temperature and −50° C. For inert gases the boiling points will, of course, be much lower than −50° C.

Microcellular foam fibers are normally spun from a round cross section spinneret. However, an annular die similar to the ones used for blown films can be used to make microcellular foam sheets. For fully inflated foams, as-spun fibers or as-extruded foam sheets can be post-inflated by immersing them in a solvent containing dissolved inflatants. Inflatants will diffuse into the cells due to the plasticizing action of the solvent. Once dried, the inflatants will stay inside the cells and air will diffuse into the cells due to osmotic pressure to keep the microcellular foams inflated.

The microcellular foams of this invention have densities between 0.005 and 0.50 gm/cc. Their cells are generally of a polyhedral shape and their average cell size is less than about 300 microns, preferably less than about 150 microns. Their cell walls are typically less than about 3 microns, preferably less than about 2 microns in thickness.

The pulps of this invention can be produced by disc refining flash spun plexifilaments as disclosed in U.S. Patent 4,608,089 to Gale & Shin. Alternatively, they can be prepared directly from polymer solutions by flash spinning using a device similar to the one disclosed in U.S. Pat. No. 5,279,776 to Shah.

The pulps made by this invention are plexifilamentary film-fibrils in nature and can have a three dimensional network structure. However, they are relatively short in length and have small dimensions in the transverse direction. Their average length is less than about 3 mm and their average diameter is less than about 200 microns, preferably less than about 50 microns. They have relatively high surface area; greater than about 1 square meter per gram when determined by BET.

The olefin/carbon monoxide alternating copolymers, especially ethylene/carbon monoxide alternating copolymers, are soluble in the cyclic alcohols and the fluorinated alcohols listed above at elevated temperatures and pressures.

Ideally, the solvents to be used for flash spinning should have high enough solvent power to dissolve polymer to give a homogeneous single-phase solution at the temperature and pressure used for mixing. However, in some case, the solvents to be used do not have to have such a high solvent power so long as their solvent power is high enough to give a reasonably stable two-phase dispersion suitable for flash spinning. In this case, both mixing and spinning will be performed below the cloud point pressure, which is the minimum pressure needed to obtain a single-phase solution at any given temperature. Methanol, ethanol, and propanols belong to this category. These alcohols do not have sufficient solvent power to dissolve ethylene/carbon monoxide homopolymer at pressures less than about 5000 psig, but their solvent power is high enough to give a relatively stable dispersion that can be flash spun into well fibrillated plexifilaments.

The most satisfactory solvents of halogenated hydrocarbon type are dichloromethane and monobromomonochloromethane.

Preparation of Alternating Ethylene/Carbon Monoxide Copolymer

The catalyst employed was obtained by adding the contents of two bottles to an autoclave as described below.

Bottle #1 contained:

Pd(OAc)2 i.e., palladium diacetate (0.44 g, 2.0 mmol)
1,3-bis(diphenylphosphino)propane (0.98 g, 2.4 mmol)
Methanol (600 mL)
Toluene (400 mL)

Bottle #2 contained:

Methanol (500 mL)

Toluene (100 mL)

Toluene sulfonic acid (7.6 g, 40 mmol)

Polymerization Conditions

A 1 gal Hastalloy autoclave was sealed and purged with nitrogen. After purging was complete, the contents of bottle #1 were added through a cannula. The contents of bottle #2 were then added. The autoclave was then cooled to 0° C. and was pressured to 850 psi with a 1:1 molar ratio of ethylene and carbon monoxide. The temperature and pressure were maintained for 48 hours. The pressure was vented to atmospheric pressure. The autoclave was warmed to room temperature and opened. The produce was a greenish-tinted solvent and off-white chunks of polymer.

Polymer Workup

Most of the supernatent solvent was decanted. The soft, white chunks of polymer were placed in methanol in a blender and homogenized. The resulting slurry was then filtered using vacuum. The polymer was then washed sequentially with acetone (1 gal.) water (1 L) and methanol (2 L). The very white powdery polymer was then dried under vacuum.

Yield 142 g.

The Polymer had the Following Properties

Number average molecular weight measured by Nuclear Magnetic Resonance technique of endgroups: 101,000.

Number average molecular weight measured by Gel permeation chromatography in hexafluoroisopropanol: 42,600.

Weight average molecular weight measured by Gel permeation chromatography in hexafluoroisopropanol: 141,000.

The apparatus and process for carrying out the examples is as described in U.S. Pat. No. 5,250,237 at column 10 and following. This patent is hereby incorporated by reference.

Test Methods

The tenacity of the flash-spun strand is determined with an Instron tensile-testing machine. The strands are conditioned and tested at 70° F. and 65% relative humidity. The sample is then twisted to 10 turns per inch and mounted in jaws of the Instron Tester. A 2-inch gauge length and an elongation rate of 100% per minute are used. The tenacity (T) at break is recorded in grams per denier.

Denier of the strand is determined from the weight of a 18 cm sample length of the strand.

Elongation of the flash-spin strand is measured as elongation at break and is reported as a percentage.

EXAMPLE 1

15 wt. % of the ethylene/carbon monoxide copolymer prepared as described above was dissolved in n-pentafluoropropanol at 240° C. at a maximum pressure of 2500 psig with a pressure differential between the two mixing compartments as described in U.S. Pat. No. 5,250,237 of 200 psig for 15 minutes.

The solution was then spun at 1100 psig at 240° C. through a thirty mil diameter spinneret orifice. The spin lasted approximately one second. The product was a plexifilament having a denier of 306 grams, a tenacity of 0.9 grams per denier, and an elongation at break of 42%. The product was well fibrilated and strong.

EXAMPLE 2

25 wt. % of the ethylene/carbon monoxide copolymer prepared as described above was dissolved in hexafluoroisopropanol at 230° C. at a maximum pressure of 2000 psig with a pressure differential between the two mixing compartments of 200 psig for 45 minutes.

The solution was then spun at 775 psig at 231° C. through a thirty mil diameter spinneret orifice. The spinning time was approximately 1.5 seconds. The product was a foam of good quality.

EXAMPLE 3

An alternating ethylene/carbon monoxide copolymer having number and weight average molecular weights as determined by the gel permeation chromatography of 14,700 and 22,500, respectively, was prepared. 65 wt. % of the polymer was dissolved in n-pentafluoropropanol at 230° C. at a maximum pressure of 2000 psig with a pressure differential between the two mixing compartments of 300 psig for one hour. The solution was spun at 230° C. through a 30 mil diameter hole spinneret using 500 psig accumulator pressure. Actual pressure during spinning was about 400 psig. Uniform microcellular foam was obtained.

EXAMPLE 4

An intermediate MW ethylene/carbon monoxide polymer having number average MW of 25,900 and weight average MW of 73,300 (determined by gel permeation chromatography) was prepared by using a procedure similar to the one described before. 20 wt. % of the polymer was mixed with methanol at 205° C. and 3000 psig for 10 min. The mixing time was reduced to minimize polymer degradation. The two-phase dispersion thus prepared was spun using accumulator pressure of 2000 psig. Actual spin pressure measured during spinning was about 1800 psig. The product was a plexifilament having a denier of 691, a tenacity of 0.73 grams per denier, and an elongation at break of 101%. In a separate experiment conducted with a view cell, it was determined that the cloud point pressure for this system at 205° C. is higher than the 3000 psig mixing pressure used, and therefore, the spin mix, which was prepared, was a two-phase dispersion rather than a single-phase solution.

EXAMPLE 5

A 20 wt. % mixture of the same polymer as used in Example 4 and methylene chloride was prepared and mixed at 215° C. at 3100 psig. The mixture was spun at 215° C. using a accumulator pressure of 2200 psig and an actual spin pressure of 750 psig. The product had a denier of 335, a tenacity of 1.35 grams per denier, and an elongation at break of 64%.

What is claimed is:

1. A process for the production of flash-spun plexifilamentary film-fibril strands of a high molecular weight alternating copolymer of ethylene and carbon monoxide or a high molecular weight alternating copolymer having alternating polymerized units of carbon monoxide and at least two different olefin units one of which is ethylene, and the remainder are selected from the group consisting of propylene, butene, pentene, hexene, heptene, octene, nonene, decene, dodecene, styrene, methyl acrylate, methyl methacrylate, vinyl acetate, undecenoic acid, undecenol, 6-chlorohexene, N-vinylpyrrolidone, and the diesters of vinylphosphonic acid in which a majority of the olefin units are ethylene units which comprises forming a spin solution of said alternating copolymer in a solvent having an atmospheric boiling point between 0° C. and 210° C., and selected from the group consisting of alcohols and halogenated hydrocarbons having 1 to 3 carbon atoms and spinning said spin solution at a pressure that is greater than the autogenous pressure of the spin solution into a region of substantially lower pressure and at a temperature at least 50° C. higher than the atmospheric boiling point of the solvent to form plexifilamentary film-fibril strands of said alternating copolymer.

2. The process of claim 1 in which the alcohol is selected from the group consisting of n-pentafluoropropanol, trifluoroethanol, 2,2,3,3,-tetrafluoro-1-propanol, hexafluoroisopropanol, heptafluoro-1-butanol, cyclohexanol, 1-methyl cyclohexanol, cis-2-methylcyclohexanol, trans-2-methylcyclohexanol, cis-3-methylcyclohexanol, trans-3-methylcyclohexanol, benzyl alcohol, phenol, and m-cresol.

3. The process of claim 1 in which the alcohol is selected from the group consisting of n-pentafluoropropanol, trifluoroethanol, 2,2,3,3,-tetrafluoro- 1-propanol, hexafluoroisopropanol, and heptafluoro-1-butanol.

4. The process of claim 1 in which the alcohol is selected from the group consisting of cyclohexanol, 1-methyl cyclohexanol, cis-2-methylcyclohexanol, trans-2-methylcyclohexanol, cis-3-methylcyclohexanol, trans-3-methylcyclohexanol, benzyl alcohol, phenol, and m-cresol.

5. The process of claim 1 in which the spin solution contains more than one of the alcohols selected from the group consisting of n-pentafluoropropanol, trifluoroethanol, 2,2,3,3,-tetrafluoro-1-propanol, hexafluoroisopropanol, heptafluoro-1-butanol, cyclohexanol, 1-methyl cyclohexanol, cis-2-methylcyclohexanol, trans-2-methylcyclohexanol, cis-3-methylcyclohexanol, trans-3-methylcyclohexanol, benzyl alcohol, phenol and m-cresol.

6. The process of claim 1 in which the alcohol is n-pentafluoropropanol.

7. The process of claim 1 where the alternating copolymer consists of polymerized ethylene units and carbon monoxide units.

8. The process of claim 1 in which the atmospheric boiling point of the solvent is between 0° and 100° C.

9. The process of claim 1 in which the solution is spun at a temperature between 200° C. and 300° C. and at a pressure of greater than 500 psig.

10. The process of claim 1 wherein the solvent is methylene chloride.

* * * * *